June 11, 1957 R. F. WOLL ET AL 2,795,713
END BRACKET FOR DYNAMOELECTRIC MACHINES
Filed Feb. 19, 1954

United States Patent Office 2,795,713
Patented June 11, 1957

2,795,713

END BRACKET FOR DYNAMOELECTRIC MACHINES

Richard F. Woll, Williamsville, and Theodore C. Fockler, Buffalo, N. Y., assignors to Westinghouse Electric Corporation, East Pittsburgh, Pa., a corporation of Pennsylvania Application February 19, 1954, Serial No. 411,370

1 Claim. (Cl. 310—254)

The present invention relates to the construction of dynamoelectric machines, and more particularly to an improved construction for the end brackets of such machines.

The principal object of the invention is to provide a dynamoelectric machine having end brackets of novel construction, which are designed so that accurate machining of the bracket during manufacture is facilitated, and so that the bracket can readily be removed from a completed machine.

A more specific object of the invention is to provide a dynamoelectric machine having end brackets provided with mounting lugs which, in addition to their usual function of receiving securing means for attaching the bracket to the frame of the machine, serve to facilitate accurate machining of the bracket during manufacture and also to facilitate removal of the bracket from a completed machine.

Figure 1:
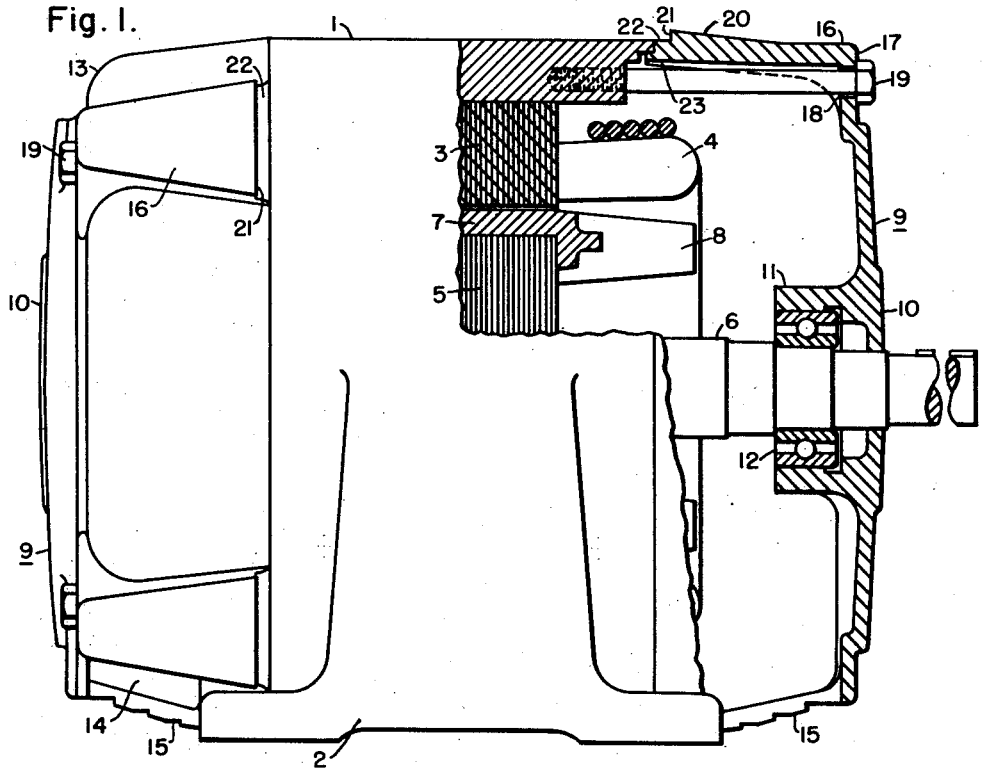
Figure 2:
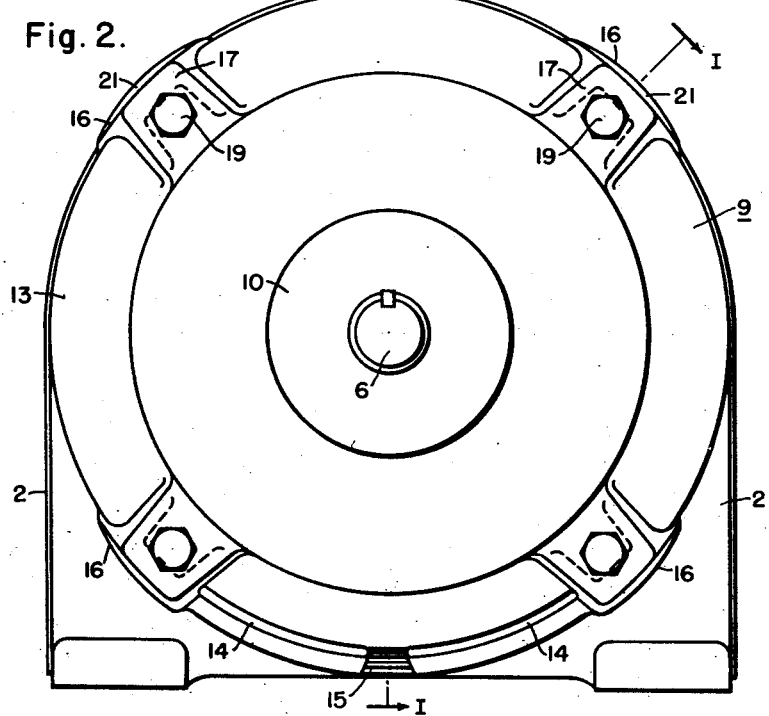

Other objects and advantages of the invention will be apparent from the following detailed description, taken in connection with the accompanying drawing, in which:

Figure 1 is a view of a dynamoelectric machine embodying the invention, partly in side elevation and partly in longitudinal section substantially on the line I—I of Fig. 2; and Fig. 2 is an end view of the machine.

The invention is shown in the drawing embodied in an alternating-current induction motor, although it will be understood that it is generally applicable to any type of dynamoelectric machine. The motor shown in the drawing has a generally cylindrical frame 1, with foot members 2 on opposite sides which may be formed integrally with the frame 1 or welded thereto. A laminated stator core 3 is pressed, or otherwise secured, in the frame 1 and carries primary windings 4 of any suitable type. The machine also has a rotor member comprising a laminated rotor core 5 mounted on a shaft 6 and carrying a squirrel-cage winding 7. Blower vanes 8 may be provided on the rotor, if desired, preferably being formed integrally with the winding 7.

The ends of the frame 1 are closed by end brackets 9 which may be identical in construction. Each of the end brackets 9 has a central hub portion 10 which includes a bearing housing 11, and ball bearings 12 are mounted in the bearing housings 11 for supporting the shaft 6. The end bracket 9 has a radial outer wall connecting the hub portion 10 with a generally longitudinal peripheral portion 13, the edge of which is adapted to engage the frame 1, preferably with a rabbet fit, as shown in Fig. 1. Ventilating openings 14, separated by a partition 15, may be provided at the lower part of the bracket, if desired, although the invention may also be applied to totally enclosed machines in which there are no openings in the brackets.

Each end bracket 9 is provided with a plurality of mounting lugs 16 equally spaced circumferentially on the peripheral surface 13 of the bracket. Each of the mounting lugs 16 has a substantially radial outer face 17 at the outer side of the bracket, that is, the side away from the frame, and the radial face 17 has an opening 18 for receiving securing means for attaching the bracket to the frame. In the embodiment shown in the drawing, bolts 19 extend through the openings 18 and are threaded into tapped holes in the frame 1 to secure the bracket to the frame.

The lugs 16 extend longitudinally of the brackets from the outer side to the inner side, and extend radially beyond the peripheral surface of the bracket. The lugs are preferably increased in radial thickness towards the inner side of the bracket, as indicated at 20, so that there is a substantial thickness extending beyond the surface of the bracket, as clearly shown in Fig. 1. In the initial machining of the bracket, an accurately dimensioned and positioned radial surface 21 is formed at the inner end of each of the lugs 16, and an accurately dimensioned and positioned longitudinal surface 22 is simultaneously formed on each lug, the radial thickness of the lug being sufficient to provide an adequate radial surface 21, which is longitudinally spaced from the edge of the bracket by the surface 22.

After the initial machining of the bracket, including forming the surfaces 21 and 22, is completed, the final machining is carried out by placing the bracket in a suitable machine tool to accurately finish the bore of the bearing housing 11 and the engaging surface 23 which engages the frame. In performing this operation, the accurately positioned surfaces 21 and 22 on the lugs are utilized for precisely locating the bracket for the final machining, and in this way the bore of the bearing housing 11 and the frame-engaging surface 23 can readily be made accurately concentric. This insures accurate concentricity of the rotor in the stator when the machine is finally assembled, and a uniform air gap is thus obtained for smooth and quiet operation of the motor.

When the motor is completely assembled, as shown in the drawing, it will be seen that the radial surfaces 21 of the lugs 16 are longitudinally spaced from the frame 1 and extend radially beyond the surface of the bracket. These surfaces, therefore, are well located to serve as lugs for facilitating removal of the end bracket, if it becomes necessary to disassemble or partially disassemble the machine for repair or other purposes. In many prior motor designs, removal of the end brackets has been very difficult because they were designed with smooth, uninterrupted surfaces which afforded no means for pulling on the brackets to remove them from the machine. The bracket design of the present invention, however, provides lugs which are well located for this purpose so that removal of the brackets, if necessary, is greatly facilitated. This result is obtained in the design of the bracket without extra cost, and without impairing the appearance of the bracket by isolated projecting lugs which serve no other purpose.

It will now be apparent that a bracket construction has been provided for dynamoelectric machines in which the mounting lugs, in addition to their usual function of receiving securing means for attaching the bracket to the frame, are also designed in such a way that accurate machining of the bracket, to insure concentricity of the rotor, is facilitated, and also so that means are provided for facilitating removal of the bracket from the frame. These results are obtained without increasing the cost of the bracket and without impairing its appearance, since the mounting lugs are so designed that they are an integral part of the bracket and contribute to the good appearance of the machine, and yet are well adapted to perform the functions described.

A preferred embodiment of the invention has been shown and described for the purpose of illustration, but it will be apparent that various modifications may be made within the scope of the invention and that the new brackets are applicable to dynamoelectric machines of any type. It is to be understood, therefore, that the invention is not limited to the specific details of construction shown, but includes all equivalent embodiments and modifications.

We claim as our invention:

A dynamoelectric machine having a stator member and a rotor member, the stator member including a frame and end brackets disposed at the ends of the frame, each of said end brackets including a bearing housing, each of said bearing housings having a cylindrical bore, bearings for the rotor member supported in said bearing housings, each of the end brackets having a generally radial central portion and a generally longitudinal peripheral portion, and each of the end brackets having a plurality of lugs on its peripheral surface spaced apart circumferentially of the bracket, each of said lugs extending longitudinally for substantially the entire length of the bracket and extending radially beyond the peripheral surface of the bracket, and each lug having a radial end portion at the side of the bracket away from the frame adapted to receive securing means for securing the bracket to the frame and having accurately positioned radial and longitudinal surfaces at the side of the bracket adjacent the frame, said radial surfaces facing the frame and being longitudinally spaced from the frame by said longitudinal surfaces and the periphery of said longitudinal surfaces being in registry with the peripheral surface of said frame, said bearing housing bore being concentric with a circle including said longitudinal surfaces.

References Cited in the file of this patent

UNITED STATES PATENTS

| 695,163 | Lundell | Mar. 11, 1902 |
| 984,260 | Berentsen | Feb. 14, 1911 |
| 1,115,947 | Lincoln | Nov. 3, 1914 |

FOREIGN PATENTS

| 147,500 | Australia | July 23, 1952 |
| 124,179 | Austria | Aug. 25, 1931 |
| 150,615 | Great Britain | Sept. 9, 1920 |
| 352,018 | Great Britain | June 29, 1931 |